June 10, 1952     J. R. RUSCITO ET AL     2,600,267
AUXILIARY PEDAL FOR FOOT BRAKE PEDALS
Filed Sept. 17, 1951
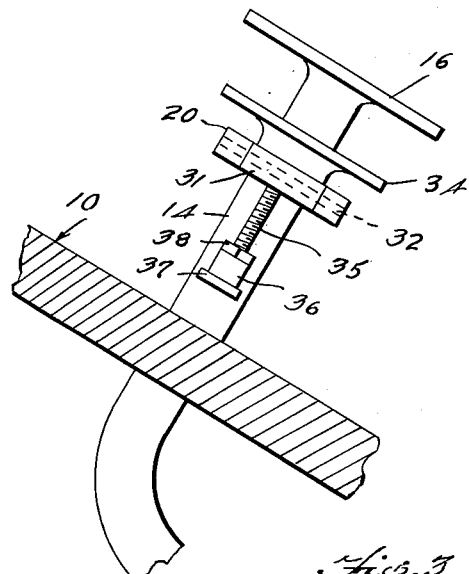
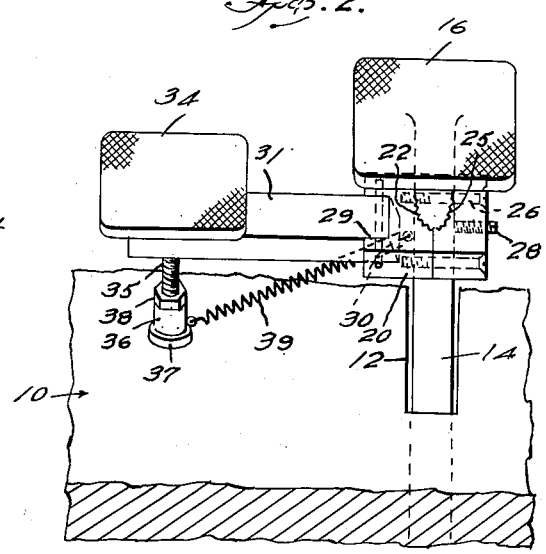
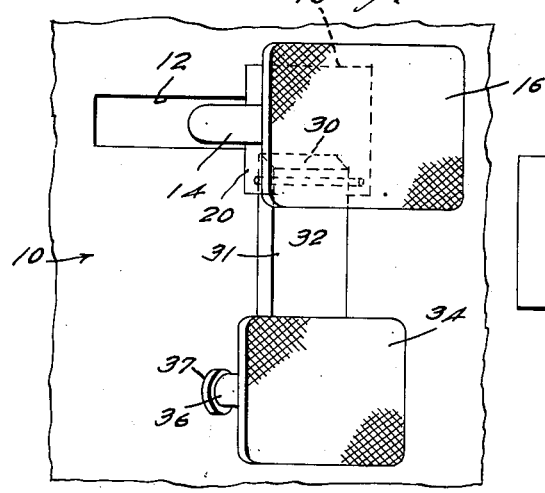
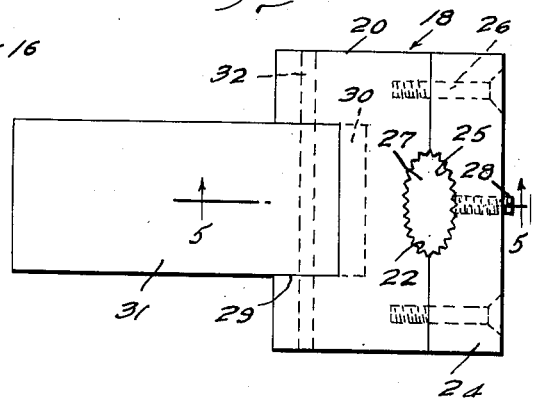
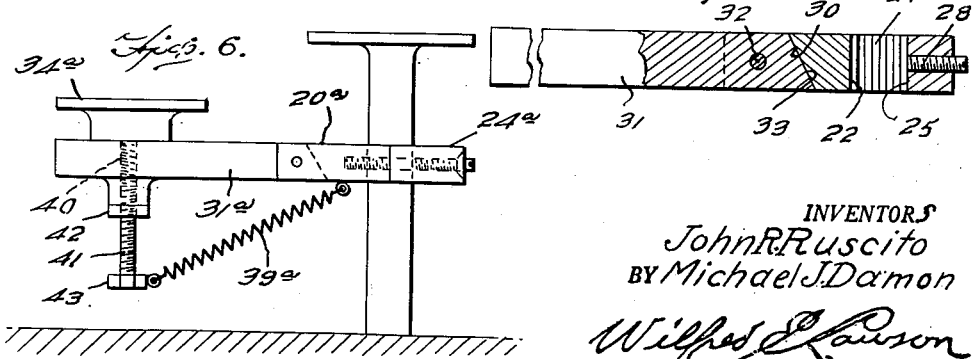
INVENTORS
John R. Ruscito
BY Michael J. Damon
Wilfred E. Lawson
ATTORNEY Patented June 10, 1952

2,600,267

UNITED STATES PATENT OFFICE 2,600,267

AUXILIARY PEDAL FOR FOOT BRAKE PEDALS

John Richard Ruscito and Michael John Damon, Altoona, Pa.

Application September 17, 1951, Serial No. 246,952

2 Claims. (Cl. 74—562.5)

This invention relates generally to motor vehicle brake operating means and is directed particularly to improvements in the foot pedal for such brakes.

In the operation of motor vehicles, particularly those of the later models which are equipped with highly efficient brakes which take hold quickly upon a slight application of pressure upon the foot pedal, it is often highly important that the brakes be lightly applied to prevent skidding particularly when the vehicle is operating at a fair speed and the roadway is either wet or icy. Under such conditions if the brake pedal is applied quickly and with too much force the brakes will grab or take hold quickly and a skid will result whereas if the brake is lightly applied or is pumped lightly the vehicle movement can be checked without throwing it into a skid.

An object of the present invention is to provide an attachment for a vehicle brake foot pedal which may be used in place of the regular foot pedal to depress or move the lever which actuates the brakes, only slightly, so as to prevent the brakes from closing tightly upon or gripping the brake drum.

Another object of the invention is to provide a device of the character stated which can be easily and quickly applied to the lever beneath the present foot pedal, without changing any of the brake adjustment, whereby the brake can be actuated easily and quickly with the auxiliary device but at the same time its depression beyond a predetermined position is prevented.

Another object of the present invention is to provide an auxiliary brake control device of the character stated which, in addition to being so designed that it can be easily and quickly applied to the brake pedal lever, will not in any way interfere with the normal operation of the regular brake pedal but which, when depressed by the foot of the vehicle operator in place of the regular brake pedal, will cause the movement of the regular brake pedal lever but will limit such movement so that the brakes can only be lightly applied.

Other objects and advantages of the invention will become apparent as the description of the same proceeds and the invention will be best understood from a consideration of the following detailed description taken in connection with the accompanying drawing forming a part of the specification, with the understanding, however, that the invention is not to be limited to the exact details of construction shown and described since obvious modifications will occur to a person skilled in the art.

In the drawing:

Figure 1 is a view in elevation of the left side of a brake pedal showing the auxiliary pedal attached thereto.

Figure 2 is a front view of the structure shown in Figure 1.

Figure 3 is a top plan view of the structure of the preceding figures.

Figure 4 is a view in plan of the mounting and arm without the auxiliary pedal.

Figure 5 is a sectional view taken substantially on the line 5—5 of Figure 4.

Figure 6 is a view in elevation of a modified form of the invention shown applied to a brake pedal.

Referring now more particularly to the drawing the numeral 10 designates a portion of the floor board in a motor vehicle adjacent to the regular foot operated pedal by which the vehicle brakes are applied. The numeral 12 designates the opening in the floor and the numeral 14 designates the brake pedal lever which passes through the floor opening and which carries upon its top the pedal or head 16 upon which the operator's foot is placed in the act of depressing the lever to apply the vehicle brakes.

In accordance with the present invention there is provided a mounting body which is generally designated 18, for attachment to the brake pedal lever 14 beneath the head 16, which mounting comprises a plate 20 having an arcuate recess 22 in one end edge, and a cap 24 having an end edge provided with a recess 25 corresponding to the recess 22, which cap is positioned against the said recessed end of the plate 20 and is secured thereto by screws 26 or in any other suitable manner. The opening 27 which is formed by the coacting recesses 22 and 25 receives the pedal lever 14 so that when the screws 26 are drawn up to tighten the cap 24 against the body 20 the pedal lever 14 will be firmly gripped.

To increase the gripping action so as to maintain the mounting 18 firmly in position on the pedal lever 14, a set screw 28 may be employed which is extended through the cap 24 in the manner illustrated to project into the opening 27.

At the outer end of the plate 20, that is, the end opposite from the end in which the recess 22 is formed, there is formed the rectangular recess or slot 29, the inner face of which slot is undercut as indicated at 30. Positioned in this slot 29 is an end of an arm 31 which is pivotally joined to the plate 20 by the pin 32 which passes transversely through the plate and the end of the arm 31 as illustrated in Figure 4.

The inner end of the arm 31, that is, the end in the slot 29, is beveled as indicated at 33 so as to engage the undercut face 30 of the slot thereby preventing the downward swinging of the outer end of the arm 31 beyond the horizontal or the plane of the plate 20. However, it will be seen that the arm 31 can readily swing upwardly on the pivot pin 32.

Upon the outer end of the arm 31 is supported an auxiliary pedal 34 which is supported at a slightly lower elevation than the head 16 of the brake pedal and it will also be seen that this auxiliary pedal is positioned to the left of the brake pedal but the arm is of such length that the auxiliary pedal 34 will not engage the adjacent steering post of the vehicle.

Directly beneath the auxiliary pedal 34 the arm 31 has fixed thereto and extending downwardly therefrom the threaded screw or stud 35 and threaded upon the lower end of this stud is a foot member comprising an internally threaded sleeve 36 in which the stud is engaged, having a lower end head 37.

The foot member, comprising the sleeve 36 and head 37, is adjusted on and lengthwise of the stud or screw 35 and after being adjusted as desired is held locked by the lock nut 38 threaded on the stud 35.

While the effect of gravity will normally maintain the arm 31 and auxiliary pedal in its down position, in order to insure against the auxiliary pedal becoming raised and caught or stuck in such raised position there is provided a spring 39 which is connected between the lower end of the foot sleeve 36 and the underside of the plate 20 adjacent to the pedal lever 14.

In Figure 6 there is shown a slight modification of the structure above described. In this modified construction the plate body is designated 20a and the cap which secures the plate body to the pedal lever 14 is designated 24a while the arm is designated 31a.

In this modified construction, in place of the fixed stud 35, the outer end of the arm is provided with a threaded bore 40 in which is threaded an end of a long screw 41. This screw is adjustable lengthwise in the bore 40 and is held in adjusted position by a lock nut 42. On the lower end of the screw is a foot member 43 and connected with this foot member is an end of a spring 39a which extends upwardly and inwardly and has its other end attached to the underside of the plate 20a. The arm 31a, of course, carries an auxiliary pedal 34a as in the first described structure.

In the operation of the present device, after the device has been secured to the brake pedal lever at the desired elevation so that the arm 31 or 31a extends to the left from the lever, the foot member carried upon the underside of the arm is adjusted with respect to the floor 10 so that when the brake pedal is in normal position there will be a clearance between the auxiliary pedal foot member and the floor which, when downward pressure is applied to the auxiliary pedal, will permit the brake pedal lever to be depressed to a sufficient extent to lightly apply the car brakes. It will be readily seen that the arm upon which the auxiliary pedal is mounted is rigid when downward pressure is applied to the auxiliary pedal but such arm can swing upwardly freely so that when the foot pedal is used in normal operation there will be no interference with its downward movement to the desired extent necessary for full and firm application of the vehicle brakes.

It will be seen from the foregoing that the present invention provides a novel auxiliary safety pedal for the application of motor brakes when the vehicle is operated on a roadway which is wet or may be slippery because of ice or some other substance on the roadway which would make it extremely dangerous or hazardous to apply the vehicle brakes to the fullest extent which would be possible by the application of pressure to the regular brake pedal.

It will also be readily apparent that the device of the present invention can be easily and quickly applied to motor vehicle brakes without having to make any changes or adjustments in the regular brake of the vehicle.

We claim:

1. In combination, a foot brake pedal and an auxiliary pedal, a pivot coupling between the pedals to permit an upward swinging movement of the auxiliary pedal on an axis extending transversely of the direction of the movement of the brake pedal, means for limiting the swinging movement of the auxiliary pedal downwardly relative to the brake pedal whereby application of downward pressure to the auxiliary pedal will force the brake pedal downwardly, a means attached to the auxiliary pedal and adjustable relative thereto for limiting the downward movement of the two pedals as a unit upon the application of downward pressure to the auxiliary pedal.

2. In combination, a floor board, a foot brake pedal passing therethrough, and an auxiliary pedal, a pivot coupling between the pedals to permit an upward swinging movement of the auxiliary pedal on an axis extending transversely of the direction of the movement of the brake pedal, means for limiting the swinging movement of the auxiliary pedal downwardly relative to the brake pedal whereby application of downward pressure to the auxiliary pedal will force the brake pedal downwardly, a stop means for limiting the downward movement of the two pedals relative to the floor board as a unit upon the application of downward pressure to the auxiliary pedal, and means whereby the stop means may be adjusted.

JOHN RICHARD RUSCITO.
MICHAEL JOHN DAMON.

REFERENCES CITED

The following references are of record in the file of this patent:

UNITED STATES PATENTS

| Number | Name | Date |
|---|---|---|
| 211,663 | Jaberg | Jan. 28, 1879 |
| 1,526,999 | Mizner | Feb. 17, 1925 |
| 1,645,846 | Andres | Oct. 18, 1927 |
| 2,078,324 | Griffiths | Apr. 27, 1937 |
| 2,124,100 | Bailey | July 19, 1938 |
| 2,342,751 | Patrick | Feb. 29, 1944 |

FOREIGN PATENTS

| Number | Country | Date |
|---|---|---|
| 501,077 | Germany | June 28, 1930 |